(12) United States Patent
Berry et al.

(10) Patent No.: US 11,015,110 B2
(45) Date of Patent: May 25, 2021

(54) METHODS OF PROTECTING METAL SURFACE DURING EXPOSURE TO FLUORIDE ION-CONTAINING ACIDIC FLUIDS

(71) Applicants: Sandra L. Berry, Fulshear, TX (US); Dustin Palm, Cypress, TX (US)

(72) Inventors: Sandra L. Berry, Fulshear, TX (US); Dustin Palm, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/192,078

(22) Filed: Nov. 15, 2018

(65) Prior Publication Data

US 2020/0157407 A1    May 21, 2020

(51) Int. Cl.

| | | |
|---|---|---|
| E21B 43/25 | (2006.01) | |
| C09K 8/54 | (2006.01) | |
| C09K 8/74 | (2006.01) | |
| E21B 41/02 | (2006.01) | |
| C23F 11/04 | (2006.01) | |
| C23F 1/26 | (2006.01) | |

(52) U.S. Cl.
CPC .............. *C09K 8/54* (2013.01); *C09K 8/74* (2013.01); *C23F 1/26* (2013.01); *C23F 11/04* (2013.01); *E21B 41/02* (2013.01); *E21B 43/25* (2013.01)

(58) Field of Classification Search
CPC ............ C09K 8/54; E21B 43/25; E21B 41/02
USPC ........................................ 166/300
See application file for complete search history.

(56) References Cited

U.S. PATENT DOCUMENTS

| | | | |
|---|---|---|---|
| 7,735,558 B2 * | 6/2010 | Welton | C23F 11/173 166/307 |
| 10,138,560 B2 | 11/2018 | Reyes et al. | |
| 2008/0274013 A1 * | 11/2008 | Stevens | C09K 8/54 422/7 |
| 2016/0369408 A1 * | 12/2016 | Reyes | C09K 8/54 |
| 2017/0298265 A1 * | 10/2017 | Smith | C09K 8/74 |

OTHER PUBLICATIONS

Hernandez et al. "Materials and Corrosion Risk Mitigation associated with flowback of acid stimulation fluids", Paper No. 8917, NACE International, Publications Division, 15835 Park Ten Place, Houston, Texas 77084 (2017) 15 pages.

Reyes et al. "Corrosion Mitigation of HF Acid-Containing Fluid for Ti in Marine Rises", SPE-189517-MS, SPE International Conference and Exhibition on Formation Damage Control, Feb. 7-9, 2018 (10 pages).

Schutz et al. "Behavior of Titanium Exposed to Fresh and Spent Dilute HF Acid Well Stimulation Fluids", Paper No. 10863, NACE International, Publications Division, 15835 Park Ten Place, Houston, Texas 77084 (2018) 18 pages.

Schutz et al. "Effective Inorganic Salt Corrosion Inhibitors for Titanium Components Exposed to Dilute Hydrofluoric Acid Well Stimulation Fluids", NACE International, Publications Division, 15835 Park Ten Place, Houston, Texas 77084, 2017 (13 pages).

\* cited by examiner

*Primary Examiner* — Angela M DiTrani Leff
*Assistant Examiner* — Ashish K Varma
(74) *Attorney, Agent, or Firm* — Cantor Colburn LLP

(57) ABSTRACT

A method of reducing corrosion of a metal surface comprises contacting a fluoride ion-containing acidic fluid with a corrosion inhibitor composition before the fluoride ion-containing acidic fluid contacts the metal surface, the corrosion inhibitor composition comprising a zirconium compound, an antimony compound, or a combination comprising at least one of the foregoing; and exposing the metal surface to the fluoride ion-containing acidic fluid.

21 Claims, No Drawings

METHODS OF PROTECTING METAL SURFACE DURING EXPOSURE TO FLUORIDE ION-CONTAINING ACIDIC FLUIDS

BACKGROUND

Acid treatment (acidizing) is a technique for increasing the production of oil or gas from a well that penetrates a subterranean formation. While acid jobs for carbonate formations are often based on hydrochloride acid, many operators utilize hydrofluoric acid-containing mixtures to stimulate sandstone formations by dissolving quartz and clay formation materials. The dissolution of sand and clay enhances formation permeability thus increasing hydrocarbon or gas production.

Conventionally, the selected acid systems are pumped from a stimulation vessel down the wellbore tubulars or conveyed by coiled tubing reel to the formation to avoid exposure of the production riser to the acids. Once the acids are "spent" in the formation, they are flowed back to the surface through the same well tubulars.

Significant cost and time savings could be realized if the spent acids could return to the surface through production riser systems. However, returning spent fluoride ion-containing acids through production riser systems poses a serious corrosion concern on the titanium metal alloys present in these systems. While titanium alloys are resistant to seawater and many other chemicals, titanium alloys are very susceptible to hydrogen fluoride corrosion. For example, in the presence of even dilute hydrogen fluoride acid systems, titanium alloys exhibit very high corrosion rates. This corrosion is so substantial that the general guidelines are that titanium alloys should not be exposed to fluid systems containing any hydrogen fluoride.

Traditional corrosion inhibitors form a film and coat metal surfaces to minimize the corrosive effects of the acids. However, these traditional corrosion inhibitors are commonly used to protect ferrous alloys during acidizing and they do not provide adequate corrosion protection on titanium alloys from acids that contain even minimal concentrations of hydrogen fluoride. Accordingly, there is a need in the art for methods that are effective to minimize the corrosion of titanium alloys when exposed to fluoride ion-containing acidic fluids.

SUMMARY

A method of reducing corrosion of a metal surface comprises contacting a fluoride ion-containing acidic fluid with a corrosion inhibitor composition before the fluoride ion-containing acidic fluid contacts the metal surface, the corrosion inhibitor composition comprising a zirconium compound, an antimony compound, or a combination comprising at least one of the foregoing; and exposing the metal surface to the fluoride ion-containing acidic fluid.

A method of treating a subterranean formation comprises injecting into the subterranean formation a treatment fluid comprising an etching agent, the etching agent comprising hydrofluoric acid; reacting the etching agent in the treatment fluid with a mineral in the subterranean formation to generate an at least partially spent acidic fluid that comprises fluoride ions; contacting a corrosion inhibitor composition comprising a zirconium compound, an antimony compound, or a combination comprising at least one of the foregoing with the at least partially spent acidic fluid prior to the at least partially spent acidic fluid contacting the metal surface; and exposing the metal surface to the at least partially spent acidic fluid.

DETAILED DESCRIPTION

The inventors hereof have developed methods that are effective to minimize titanium alloy corrosion by using treatment fluids or corrosion inhibitor compositions that contain a zirconium compound, an antimony compound, or a combination comprising at least one of the foregoing. Advantageously, the corrosion inhibitor compositions are effective to protect titanium alloys from corrosion when exposed to fluoride ion-containing acidic fluids at elevated pressures and temperatures for a prolonged period of time.

Examples of the zirconium compound include zirconium lactate; sodium zirconium lactate; zirconium sulfate; zirconium tetrachloride; zirconium carbonate; zirconium acetate; zirconium orthosulfate; zirconium oxychloride; zirconium ammonium carbonate; or zirconium acetylacetonate. Combinations of the zirconium compounds can be used. Preferably the zirconium compound comprises zirconium lactate, sodium zirconium lactate, or a combination thereof.

The zirconium compound can be present in an amount of about 10 wt % to about 90 wt %, preferably about 20 wt % to about 80 wt %, more preferably about 30 wt % to about 60 wt % or about 65 wt % to about 85 wt %, based on the total weight of the inhibitor compositions. In an embodiment the zirconium compound is present in such an amount that the corrosion inhibitor compositions contain about 2 wt % to about 10 wt %, about 5 wt % to about 10 wt % or about 5 wt % to about 8 wt % of zirconium based on the total weight of the inhibitor compositions.

Antimony compounds include antimony chloride, antimony bromide, or a combination thereof. The corrosion inhibitor compositions can contain about 15 wt % to about 40 wt %, or about 19 wt % to about 38 wt % of the antimony compound. In an embodiment, the corrosion inhibitor compositions contain a zirconium compound and less than 10 wt %, less than 5 wt %, or substantially free of antimony compounds. Such corrosion inhibitor compositions can have good compatibility with various acid systems.

The inhibitor compositions can further include an aluminum compound. Examples of the aluminum compound include aluminum chlorohydrate; polyaluminum sulfate; aluminum sulfate; sodium aluminate; aluminum chloride; aluminum nitrate; or aluminum citrate. Preferably, the aluminum compound comprises aluminum chlorohydrate.

The inhibitor compositions can contain about 5 wt % to about 40 wt %, preferably about 10 wt % to about 35 wt %, more preferably about 15 wt % to about 35 wt % of the aluminum compound based on the total weight of the inhibitor compositions. In an embodiment the aluminum compound is present in such an amount that the corrosion inhibitor compositions contain about 0.5 wt % to about 10 wt %, about 0.5 wt % to about 5 wt %, or about 1 wt % to 3 wt % of aluminum based on the total weight of the inhibitor compositions.

When both present, the relative amounts of the zirconium compound and the aluminum compound can be adjusted to about 10:1 to about 1:1, about 5:1 to about 1:1, or about 4:1 to about 2:1.

In general, the corrosion inhibitor compositions are aqueous compositions that further contain water or a brine.

A specific example of corrosion inhibitor composition contains about 50 wt % to about 85 wt % or 65 wt % to 85 wt % of a zirconium compound such as zirconium lactate, sodium zirconium lactate, or a combination thereof and about 15 wt % to about 50 wt % or 15 wt % to 35 wt % of an aluminum compound such as aluminum chlorohydrate, each based on the total weight of the inhibitor composition.

The corrosion inhibitor compositions as disclosed herein provide effective protection to metal surfaces when the surfaces are exposed to fluoride ion-containing acidic fluids. In particular, the metal surfaces contain a titanium alloy. As used herein, titanium alloys refer to metals that contain titanium as the main component. Titanium alloys can be alpha alloys, beta alloys, or alpha-beta alloys. Titanium alloys include ASTM B381 grades 1-38. An example of the titanium alloy that has been used in production riser systems is ASTM B381 grade 29. The corrosion inhibitor compositions as disclosed herein are particularly useful to minimize the corrosion of Grade 29 titanium alloy, thus making it possible for spent fluoride ion-containing acidic fluids to return to the surface through production riser systems.

In an embodiment, the fluoride ion-containing acidic fluid is an at least partially spent downhole treatment fluid. The at least partially spent acidic fluid can have a pH of about 3 to about 6, about 3 to about 5, or about 3 to about 4. The fluoride ion-containing acidic fluid comprises water or brine, and fluoride ions. Accordingly, the method can further comprise injecting into a subterranean formation a treatment fluid comprising an etching agent; and reacting a mineral in the subterranean formation with the etching agent in the treatment fluid to generate the fluoride ion-containing acidic fluid.

The etching agent includes hydrofluoric acid. The hydrofluoric acid can be present in an amount of about 0.1 to about 20 vol %, about 1 to about 15 vol %, or about 1 to about 10 vol %, based on the total volume of the treatment fluid. In addition to hydrofluoric acid, other etching agent can optionally be present in the treatment fluid. These optional etching agents include hydrochloric acid; acetic acid; formic acid; sulfamic acid; citric acid; chloroacetic acid; glutamic acid diacetic acid (GLDA); methanesulfonic acid (MSA); ethylene diamine tetraacetic acid (EDTA); 1,6-hexandiamine tetraacetic acid (HDTA); an amino carboxylic acid; a dicarboxylic acid such as succinic acid; glutaric acid; adipic acid; or a combination comprising at least one of the foregoing. In an embodiment, the etching agent further includes hydrochloric acid, acetic acid, formic acid, or a combination comprising at least one of the foregoing.

The treatment fluids can further contain water or a brine. Optionally, the treatment fluids also contain conventional corrosion inhibitors and other additives that are normally used in an acid treatment. The pH of the treatment fluids can be about 1 to about 3.

The mineral in the subterranean formation includes silicates such as quartz, feldspar, or a combination comprising at least one of the foregoing. In an embodiment, the subterranean formation is a sandstone formation. After the etching agent at least partially reacts with a mineral such as silicates in the subterranean formation, the treatment fluid is "spent."

Fluoride ion-containing acidic fluids can be very corrosive to metal surfaces, particularly those containing titanium alloys. The corrosion inhibitor compositions as disclosed herein can effectively reduce the corrosion of metal surfaces when the metal surfaces are exposed to an acidic fluid containing fluoride ions. For example, using the disclosed corrosion inhibitor compositions can reduce the corrosion rate of the metal surfaces to less than 2 Mils per day, less than 1 Mil per day, or less than 0.5 Mil per day when the metal surfaces are exposed to an acidic fluid containing fluoride ions.

To protect the metal surfaces, the corrosion inhibitor compositions can contact the metal surface while the metal surface is exposed to the fluoride ion-containing acid fluids. This can be achieved by adding the corrosion inhibitor compositions to the treatment fluid before the treatment fluid is spent or by adding the corrosion inhibitor compositions to the treatment fluid after the treatment fluid is spent. For example, the corrosion inhibitor compositions can be injected into the fluoride ion-containing acidic fluid before the fluoride ion-containing acidic fluid contacts the metal surface. In another embodiment, the corrosion inhibitor compositions contact the metal surface before the metal surface is exposed to the fluoride ion-containing acidic fluid.

The inhibitor compositions can be added in an amount of about 5 to about 40 vol %, about 10 to about 30 vol %, or about 15 vol % to 30 vol % based on the sum of the volumes of the inhibitor compositions and the fluoride ion-containing acidic fluid.

Advantageously, the corrosion inhibitor compositions are effective to protect metal surfaces against corrosion under high temperature and high pressure conditions. In an embodiment, the corrosion inhibitor compositions reduce the corrosion rate to 2 Mils per day or less, or 1 Mil per day or less, or 0.5 Mil per day or less, when the metal surfaces are exposed to the fluoride ion-containing acidic fluid at a temperature of about 70° C. to about 300° F., and a pressure of about 1,000 psi to about 4,000 psi.

The corrosion inhibitor compositions are particularly useful to protect titanium alloy surfaces present in production systems, for example stress joint surfaces in production riser systems. In particular, the corrosion inhibitor compositions can be pumped down a production system to meet and interact with the at least partially spent fluoride ion-containing acidic fluid and make the hydrogen fluoride unavailable to corrode or etch the titanium alloys present in the riser systems.

The beneficial effects of using corrosion inhibitors in fluoride ion-containing acidic fluids are further illustrated in the following examples. Unless specified otherwise, the percent is weight percent based on the total weight of the composition.

EXAMPLES

The materials used in the Examples are described in Table 1.

TABLE 1

| Item | Chemical Description |
| --- | --- |
| A | 75% zirconium lactate (chloride based, 5.2% active Zr) + 25% aluminum chlorohydrate (2.4% active aluminum) |
| B | 30 to 60% aminosilane |
| C | 40 to 50% chromic acetate |
| D | 10 to 20% boric acid |
| E | 30-60% antimony chloride |
| F | 30-60% zirconium complexes |
| Spent Acid-1 | Aqueous fluid containing 10 vol % acetic acid, 5 vol % formic acid, 1.5 vol % HF, and additives, spent according to the procedure described herein, having a pH of 2-3 before the aqueous fluid is spent and a pH of 3-4 after the aqueous fluid is spent |
| Spent Acid-2 | Aqueous fluid containing 8 vol % HTOA (a dicarboxylic acid system), 1.5 vol % HF, and additives, spent according to the procedure described herein, having |

TABLE 1-continued

| Item | Chemical Description |
|---|---|
| | a pH of 3.8-4 after the aqueous fluid is spent |
| Test coupon | Ti 29 coupon |

HF Fluids Spent Procedure

The HF fluids that may be used in acidification treatments were mixed with a rock composition in amounts shown in Table 2. The mixture was heated to 150° F. and the fluids and solids were allowed to remain in contact for 24 hours. After 24 hours, the fluid was filtered through a 10 micron Whatman filter. The pH of the filtered fluid was measured and recorded.

TABLE 2

| Additives | Grams per liter of HF fluid | Percentage (wt %) |
|---|---|---|
| Sand | 296.6 g | 95% |
| Kaolinite | 6.24 g | 2% |
| Bentonite | 3.13 g | 1% |
| Feldspar | 6.24 g | 2% |
| Total | 312.22 g | 100% |

Corrosion Studies

Test coupons, either cut from a pipe or obtained from a metal test coupon supplier, were selected to be representative of the casing, tubing or tool that is contained in the well to be treated. All test coupons may be checked for their chemistry using an XRF (X-Ray Fluorescence) Analysis. Corrosion studies were conducted with ASTM B381 Grade 29 Titanium (UNS R56404) in the ready-to-test beta-annealed and stress relieved fully transformed condition.

The Ti-29 Grade coupons were tested at 170° F. and 3500 psi with 4 hours exposure to the spent acids listed in Table 1. Each coupon was washed and dried before and after testing. Laboratory tests were conducted using a Chandler Model 5617 High Temperature/High Pressure Corrosion Autoclave or in a continuous heating water bath at atmospheric pressure. It will be recognized by one skilled in the art that the method cannot be limited to the specific procedures described herein, and can be modified to meet other specified requirements.

The percentage (%) in Tables 3-7 refers to volume percent based on the sum of the volumes of the spent acid and the inhibitor composition.

Environmental Assisted Cracking (EAC) Studies

Tests were conducted to measure the hydrogen uptake in a surface of the metal and at a location deeper down in the metal core after the metal is exposed to a spent acid as shown in Table 1 at 170° F. and 3500 psi for 4 hours.

Results

Inhibitors A to E were added to Spent Acid-1 in amounts shown in Table 3.

TABLE 3

| Test # | Treatment | Inhibitor Addition (vol %) | Fluid Mixture Description |
|---|---|---|---|
| 1 | None | 0 | Clear dark red solution, No Precipitate |
| 2 | A | 25 | Slight haze developed, No Precipitate |
| 3 | A | 15 | Slight haze developed, No Precipitate |
| 4 | A | 10 | No significant haze formed |
| 5 | A | 5 | No change, No Precipitate |
| 6 | A | 2.5 | No change, No Precipitate |
| 7 | B | 25 | Slight haze developed, No precipitate |
| 8 | B | 15 | Slight haze developed, No precipitate |
| 9 | C | 25 | Darken Fluid, No Precipitate |
| 10 | C | 15 | Darken Fluid, No Precipitate |
| 11 | D | 25 | No change, No Precipitate |
| 12 | D | 15 | No change, No Precipitate |
| 13 | E | 25 | Very milky with a Brown Precipitate |
| 14 | E | 15 | Very milky with a Brown Precipitate |

The results indicate that Inhibitors A, B C, and D all have good compatibility with the spent acids tested as no precipitates were observed at the tested loading levels. Inhibitor E formed a brown precipitate when combined with Spent Acid-1 at loading levels of 15% and 25%.

The results of the acid corrosion studies conducted with the Spent Acid-1 are detailed in Table 4 below.

TABLE 4

Spent Acid-1 at 170° F., 3500 psi for 4 hours Exposure

| Test # | Treatment | Inhibitor Addition (vol %) | Corrosion Rate (Mils/Day) | Corrosion Rate (Lbs./Sq.Ft.) |
|---|---|---|---|---|
| 15 | None | 0 | 18.09 | 0.0706 |
| 16 | A | 25 | 0.01 | 0.0000 |
| 17 | A | 15 | 0.01 | 0.0000 |
| 18 | B | 25 | 15.64 | 0.0610 |
| 19 | B | 15 | 19.24 | 0.0751 |
| 20 | C | 25 | 13.13 | 0.0512 |
| 21 | C | 15 | 15.61 | 0.0609 |
| 22 | D | 25 | 7.37 | 0.0288 |
| 23 | D | 15 | 8.03 | 0.0313 |
| 24 | E | 25 | 0.22 | 0.0009 |
| 25 | E | 15 | 0.23 | 0.0009 |

The preferred corrosion rate specification for Titanium 29 metal in the presence of HF acid is to be less than 0.5 Mil per day. As shown in Table 4, titanium alloy coupons had a corrosion rate ranging from 8.03 to 19.24 Mils per day in the presence of Inhibitors B, C, or D, which is well above the preferred corrosion rate of 0.5 Mil per day. Surprisingly, Inhibitor A provides excellent protection to titanium alloys, and the test coupon had a corrosion rate of 0.01 Mil per day when 15 vol % of Inhibitor A was used, which is well below the 0.5 Mil per day specification. Inhibitor E also provides effective protection to titanium alloys as the test coupon had a corrosion rate of 0.22 or 0.23 Mil per day based on 25 vol % or 15 vol % loading level.

Inhibitor A was tested at different concentrations for efficiency to protect titanium alloys in Spent Acid-1. The results are summarized in Table 5.

TABLE 5

Spent Acid-1 at 170° F., 3500 psi for 4 hours Exposure

| Test # | Treatment | Inhibitor Addition (vol %) | Corrosion Rate (Mils/Day) | Corrosion Rate (Lbs./Sq.Ft.) |
|---|---|---|---|---|
| 26 | A | 10 | 1.65 | 0.0064 |
| 27 | A | 5 | 4.82 | 0.0188 |
| 28 | A | 2.5 | 7.96 | 0.0311 |

The results indicate that at a loading level of 5% or less, Inhibitor A does to provide efficient corrosion resistance to titanium alloys when exposed to Spent Acid-1.

The effectiveness of Inhibitor A in preventing corrosion of a titanium alloy in Spent Acid-2 was evaluated. The results are shown in Table 6.

TABLE 6

Spent Acid-2 at 170° F., 3500 psi for 4 hours Exposure

| Test # | Treatment | Inhibitor Addition (vol %) | Corrosion Rate (Mils/Day) | Corrosion Rate (Lbs./Sq.Ft.) |
|---|---|---|---|---|
| 29 | Control | 0 | 12.89 | 0.0488 |
| 30 | A | 25 | 0.0046 | 0.0000 |
| 31 | A | 15 | 0.02 | 0.0001 |
| 32 | A | 10 | 0.08 | 0.0003 |
| 33 | A | 5 | 1.99 | 0.0078 |

Without any corrosion inhibitor, the titanium alloy coupon had a corrosion rate of 12.89 Mils per day when exposed to Spent Acid-2 at 170° F. at 3500 psi. After 5 vol % of Inhibitor A was added, the corrosion rate was reduced to 1.99 Mils per day when tested under the same conditions. Increasing the loading level of Inhibitor A further reduces the corrosion rate of titanium alloy. When 25 vol % of Inhibitor A was added, the corrosion rate was 0.0046 Mil per day, well below the 0.5 Mil per day specification. The results indicate that Inhibitor A provides excellent corrosion protection to titanium alloys when exposed to Spent Acid-2 under high pressure and high temperature conditions.

The effectiveness of Inhibitor F in preventing corrosion of a titanium alloy in Spent Acid-2 was evaluated. The results are shown in Table 7.

TABLE 7

| Test # | Treatment | Inhibitor Addition (vol %) | Corrosion Rate | Corrosion Rate (Lbs./Sq.Ft.) |
|---|---|---|---|---|
| Spent Acid-2 + Additives at 170° F. for 4 | | | | |
| 34 | None | 0 | 14.0 | 0.0546 |
| 35 | F | 25 | 0.00 | 0.0003 |
| 36 | F | 15 | 00.00 | 0.0004 |
| 37 | F | 10 | 0.006 | 0.0000 |
| 38 | F | 5 | 2.7 | 0.0107 |
| Spent Acid-1 + Additives at 170° F. for 4 Hours | | | | |
| 39 | None | 0 | 14.0 | 0.0546 |
| 40 | F | 25 | 0.00 | 0.0005 |
| 41 | F | 15 | 2.7 | 0.0106 |
| 42 | F | 10 | 1.3 | 0.0051 |
| 43 | F | 5 | 73.9 | 0.0308 |

Without any corrosion inhibitor, the titanium alloy coupon had a corrosion rate of 14 Mils per day when exposed to Spent Acid-2 at 170° F. and 3500 psi. After 5 vol % of Inhibitor F was added, the corrosion rate was reduced to 2.7 Mils per day when tested under the same conditions. Increasing the loading level of the Inhibitor F further reduces the corrosion rate of titanium alloy. When 10 vol % or 15 vol % of Inhibitor F was added, the corrosion rate was reduced to 0.0006 or 0 Mil per day, well below the 0.5 Mil per day specification.

Similarly, without any corrosion inhibitor, the titanium alloy coupon had a corrosion rate of 14 Mils per day when exposed to Spent Acid-1 at 170° F. and 3500 psi. After 10 vol % of Inhibitor F was added, the corrosion rate was reduced to 1.3 Mils per day when tested under the same conditions. When 25 vol % of Inhibitor F was added, the corrosion rate was reduced to 0 Mil per day.

The results indicate that Inhibitor F provides excellent corrosion protection to titanium alloys when exposed to Spent Acid-1 and Spent Acid-2 under high pressure and high temperature conditions.

Corrosion rate and hydrogen uptake test results for Grade 29 Ti coupons exposed to Spent Acid-1 and Spent Acid-2 are further summarized in Tables 8. The preferred specification for hydrogen uptake can be less than +10 surface and less than +10 core. As shown in Table 8, in the presence of 15 vol % Inhibitor A or 15 vol % of Inhibitor E, the titanium alloy can meet the preferred hydrogen uptake specification when exposed to Spent Acid-1 at 1.707. In the presence of 10 vol % or higher amount of inhibitor A, the titanium alloy can also meet the preferred hydrogen uptake specification when exposed to Spent Acid-2 at 170° C.

TABLE 8

| Test # | Treatment | Inhibitor Addition (Vol %) | Corrosion Rate (Mils/Day) | Hydrogen Uptake [A H, wppm] |
|---|---|---|---|---|
| Spent Acid-1 + Additives at 170° F. for 4 Hours Exposure | | | | |
| 44 | None | 0 | 18.1 | +305 Surface, +237 Core |
| 45 | A | 15 | 0.01 | +5 Surface, +8 Core |
| 46 | | 10 | 1.7 | +40 Surface, +33 Core |
| 47 | | 5 | 4.8 | +203 Surface, +132 Core |
| 48 | B | 25 | 15.6 | +484 Surface, +266 Core |
| 49 | C | 25 | 13.1 | +388 Surface, +270 Core |
| 20 | D | 25 | 7.4 | +251 Surface, +183 Core |
| 51 | E | 15 | 0.2 | +6 Surface, +9 Core |
| Spent Acid-2 + Additives at 170° F. for 4 Hrs Exposure | | | | |
| 52 | None | 0 | 12.9 | +242 Surface, +160 Core |
| 53 | A | 15 | 0.02 | +1 Surface, +3 Core |
| 54 | | 10 | 0.08 | +4 Surface, +7 Core |
| 55 | | 5 | 2.0 | +43 Surface, +45 Core |

Further included in this disclosure are the following specific embodiments, which do not necessarily limit the claims.

Embodiment 1

A method of reducing corrosion of a metal surface, the method comprising: contacting a fluoride ion-containing acidic fluid with a corrosion inhibitor composition before the fluoride ion-containing acidic fluid contacts the metal surface, the corrosion inhibitor composition comprising a zirconium compound, an antimony compound, or a combination comprising at least one of the foregoing; and exposing the metal surface to the fluoride ion-containing acidic fluid.

Embodiment 3

The method as in any prior embodiment, wherein the fluoride ion-containing acidic fluid is an at least partially spent downhole treatment fluid.

Embodiment 6

The method as in any prior embodiment, wherein the inhibitor composition is added in an amount of about 5 to about 40 vol % based on the sum of the volumes of the inhibitor composition and the fluoride ion-containing acidic fluid.

Embodiment 7

A method of treating a subterranean formation, the method comprising: injecting into the subterranean formation a treatment fluid comprising an etching agent, the etching agent comprising hydrofluoric acid; reacting the etching agent in the treatment fluid with a mineral in the subterranean formation to generate an at least partially spent acidic fluid that comprises fluoride ions; contacting a corrosion inhibitor composition comprising a zirconium compound, an antimony compound, or a combination comprising at least one of the foregoing with the at least partially spent acidic fluid prior to the at least partially spent acidic fluid contacting the metal surface; and exposing the metal surface to the at least partially spent acidic fluid.

Embodiment 8

The method as in any prior embodiment, further comprising injecting the inhibitor composition after the etching agent reacts with the mineral in the subterranean formation to generate the at least partially spent acidic fluid but before the metal surface is exposed to the at least partially spent acidic fluid.

Embodiment 9

The method as in any prior embodiment, wherein the metal surface comprises a titanium alloy.

Embodiment 10

The method as in any prior embodiment, wherein the metal surface is a surface of a stress joint.

Embodiment 11

The method as in any prior embodiment, wherein the metal surface is exposed to the fluoride ion-containing acidic fluid or the at least partially spent acidic fluid at a pressure of 1,000 psi to 4,000 psi and a temperature of 100 to 350° F.

Embodiment 12

The method as in any prior embodiment, wherein the zirconium compound comprises one or more of the following: zirconium lactate; sodium zirconium lactate; zirconium sulfate; zirconium tetrachloride; zirconium carbonate; zirconium acetate; zirconium orthosulfate; zirconium oxychloride; zirconium ammonium carbonate; or zirconium acetylacetonate.

Embodiment 13

The method as in any prior embodiment, wherein the inhibitor composition comprises about 2 wt % to about 10 wt % of zirconium based on the total weight of the inhibitor composition.

Embodiment 14

The method as in any prior embodiment, wherein the inhibitor composition further comprises one or more of the following aluminum compound: aluminum chlorohydrate; polyaluminum sulfate; aluminum sulfate; sodium aluminate; aluminum chloride; aluminum nitrate; or aluminum citrate.

Embodiment 15

The method as in any prior embodiment, wherein the inhibitor composition comprises about 0.5 wt % to about 10 wt % aluminum based on the total weight of the inhibitor composition.

Embodiment 16

The method as in any prior embodiment, wherein the inhibitor composition comprises about 50 wt % to about 85 wt % of the zirconium compound and about 15 wt % to about 50 wt % of the aluminum compound, based on the total weight of the inhibitor composition.

Embodiment 17

The method as in any prior embodiment, wherein the inhibitor composition is an aqueous composition that further comprises water or a brine.

Embodiment 18

The method as in any prior embodiment, wherein the inhibitor composition is added in an amount of about 5 to about 40 vol % based on the sum of the volumes of the inhibitor composition and the at least partially spent acidic fluid.

Embodiment 19

The method as in any prior embodiment, wherein the fluoride ion-containing acidic fluid or at least partially spent acidic fluid has a pH of about 3 to about 6.

Embodiment 20

The method as in any prior embodiment, wherein the mineral comprises a silicate.

All ranges disclosed herein are inclusive of the endpoints, and the endpoints are independently combinable with each other. As used herein, "combination" is inclusive of blends, mixtures, alloys, reaction products, and the like. The size of the particles refers to the largest dimension of the particles and can be determined by high resolution electron or atomic force microscope technology. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

The invention claimed is:

1. A method of reducing corrosion of a metal surface, the method comprising:
   contacting a fluoride ion-containing acidic fluid with a corrosion inhibitor composition before the fluoride ion-containing acidic fluid contacts the metal surface, the corrosion inhibitor composition comprising a zirconium compound or a combination comprising the zirconium compound and an antimony compound to form a treated fluoride ion-containing acidic fluid; and exposing the metal surface to the treated fluoride ion-containing acidic fluid, wherein the zirconium compound comprises one or more of the following: zirconium lactate; sodium zirconium lactate; zirconium sulfate; zirconium tetrachloride; zirconium carbonate; zirconium acetate; zirconium orthosulfate; zirconium oxychloride; zirconium ammonium carbonate; or zirconium acetylacetonate, and the zirconium compound is present in such an amount that the inhibitor composition comprises about 2 wt % to about 10 wt % of zirconium based on the total weight of the inhibitor composition, the inhibitor composition is added in an amount of about 5 to about 40 vol % based on the sum of the volumes of the inhibitor composition and the fluoride ion-containing acidic fluid, and the metal surface has a corrosion rate of 2 Mils per day or less, when exposed to the treated fluoride ion-containing acidic fluid at a temperature of about 70° F. to about 300° F. and a pressure of about 1,000 psi to about 4,000 psi.

2. The method of claim 1, wherein the metal surface comprises a titanium alloy.

3. The method of claim 1, wherein the fluoride ion-containing acidic fluid is an at least partially spent downhole treatment fluid.

4. The method of claim 1, wherein:
the zirconium compound is present in such an amount that the inhibitor composition comprises about 5 wt % to about 8 wt % of zirconium based on the total weight of the inhibitor composition.

5. The method of claim 4, wherein the inhibitor composition is added in an amount of about 10 to about 30 vol % based on the sum of the volumes of the inhibitor composition and the fluoride ion-containing acidic fluid.

6. The method of claim 1, wherein the corrosion inhibitor composition is free of boric acid.

7. The method of claim 1, wherein the zirconium compound comprises one or more of the following: zirconium lactate; or sodium zirconium lactate.

8. The method of claim 1, wherein the metal surface has a corrosion rate of 1 Mil per day or less, when exposed to the treated fluoride ion-containing acidic fluid at a temperature of about 70° F. to about 300° F. and a pressure of about 1,000 psi to about 4,000 psi.

9. The method of claim 1, wherein the metal surface has a corrosion rate of 0.5 Mil per day or less, when exposed to the treated at least partially spent fluoride ion-containing acidic fluid at a temperature of about 70° F. to about 300° F. and a pressure of about 1,000 psi to about 4,000 psi.

10. A method of treating a subterranean formation, the method comprising:
injecting into the subterranean formation a treatment fluid comprising an etching agent, the etching agent comprising hydrofluoric acid;
reacting the etching agent in the treatment fluid with a mineral in the subterranean formation to generate an at least partially spent acidic fluid that comprises fluoride ions;
contacting a corrosion inhibitor composition comprising a zirconium compound, or a combination comprising the zirconium compound and an antimony compound with the at least partially spent acidic fluid prior to the at least partially spent acidic fluid contacting the metal surface to provide a treated at least partially spent acidic fluid; and exposing the metal surface to the treated at least partially spent acidic fluid, wherein the zirconium compound comprises one or more of the following: zirconium lactate; sodium zirconium lactate; zirconium sulfate; zirconium tetrachloride; zirconium carbonate; zirconium acetate; zirconium orthosulfate; zirconium oxychloride; zirconium ammonium carbonate; or zirconium acetylacetonate; and the zirconium compound is present in such an amount that the inhibitor composition comprises about 2 wt % to about 10 wt % of zirconium based on the total weight of the inhibitor composition, the inhibitor composition is added in an amount of about 5 to about 40 vol % based on the sum of the volumes of the inhibitor composition and the at least partially spent acidic fluid, and the metal surface has a corrosion rate of 2 Mils per day or less, when exposed to the treated at least partially spent acidic fluid at a temperature of about 70° F. to about 300° F. and a pressure of about 1,000 psi to about 4,000 psi.

11. The method of claim 10, further comprising injecting the inhibitor composition after the etching agent reacts with the mineral in the subterranean formation to generate the at least partially spent acidic fluid but before the metal surface is exposed to the at least partially spent acidic fluid.

12. The method of claim 10, wherein the metal surface comprises a titanium alloy.

13. The method of claim 10, wherein the metal surface is a surface of a stress joint.

14. The method of claim 10, wherein the metal surface is exposed to the at least partially spent acidic fluid at a pressure of 1,000 psi to 4,000 psi and a temperature of 100 to 350° F.

15. The method of claim 10, wherein the zirconium compound comprises one or more of the following: zirconium lactate; or sodium zirconium lactate.

16. The method of claim 10, wherein the inhibitor composition comprises about 5 wt % to about 8 wt % of zirconium based on the total weight of the inhibitor composition.

17. The method of claim 10, wherein the inhibitor composition is an aqueous composition that further comprises water or a brine.

18. The method of claim 10, wherein the at least partially spent acidic fluid has a pH of about 3 to about 6.

19. The method of claim 10, wherein the mineral comprises a silicate.

20. The method of claim 10, wherein the corrosion inhibitor composition is free of boric acid.

21. A method of treating a subterranean formation, the method comprising:
injecting into the subterranean formation a treatment fluid comprising an etching agent, the etching agent comprising hydrofluoric acid;
reacting the etching agent in the treatment fluid with a mineral in the subterranean formation to generate an at least partially spent acidic fluid that comprises fluoride ions;
contacting a corrosion inhibitor composition comprising an antimony compound with the at least partially spent acidic fluid prior to the at least partially spent acidic fluid contacting the metal surface to provide a treated at least partially spent acidic fluid; and exposing the metal surface to the treated at least partially spent acidic fluid,
wherein the antimony compound comprises antimony chloride, antimony bromide, or a combination thereof; and
the antimony compound is present in an amount of about 15 wt % to about 40 wt % based on the total weight of the corrosion inhibitor composition,
wherein the corrosion inhibitor composition is free of boron-containing compounds; and
the metal surface has a corrosion rate of 2 Mils per day or less, when exposed to the treated at least partially spent acidic fluid at a temperature of about 70° F. to about 300° F. and a pressure of about 1,000 psi to about 4,000 psi.

* * * * *